US007397365B2

(12) United States Patent
Wang

(10) Patent No.: US 7,397,365 B2
(45) Date of Patent: Jul. 8, 2008

(54) VEHICLE SPEEDING ALERT SYSTEM FOR GPS ENABLED WIRELESS DEVICES

(75) Inventor: Shengqiang Wang, Raleigh, NC (US)

(73) Assignee: Lucent Technologies Inc., Murray Hill, NJ (US)

( * ) Notice: Subject to any disclaimer, the term of this patent is extended or adjusted under 35 U.S.C. 154(b) by 220 days.

(21) Appl. No.: 11/283,994

(22) Filed: Nov. 21, 2005

(65) Prior Publication Data

US 2007/0115113 A1 May 24, 2007

(51) Int. Cl.
*G08B 1/08* (2006.01)
*H04Q 7/00* (2006.01)

(52) U.S. Cl. .................. 340/539.13; 340/901; 701/117

(58) Field of Classification Search ............ 340/539.13, 340/901, 902, 905, 936; 701/117, 119
See application file for complete search history.

(56) References Cited

U.S. PATENT DOCUMENTS

| | | | | |
|---|---|---|---|---|
| 6,163,277 | A * | 12/2000 | Gehlot | 340/905 |
| 6,265,989 | B1 * | 7/2001 | Taylor | 340/901 |
| 6,462,675 | B1 * | 10/2002 | Humphrey et al. | 340/905 |
| 6,473,000 | B1 * | 10/2002 | Secreet et al. | 340/933 |
| 6,748,322 | B1 * | 6/2004 | Fernandez | 701/213 |
| 6,845,317 | B2 * | 1/2005 | Craine | 340/905 |
| 6,895,324 | B2 * | 5/2005 | Straub | 701/117 |
| 2007/0159355 | A1 * | 7/2007 | Kelly et al. | 340/905 |
| 2008/0010002 | A1 * | 1/2008 | DeKock et al. | 701/117 |

* cited by examiner

*Primary Examiner*—John Tweel, Jr.

(57) ABSTRACT

A vehicle speeding alert system is implemented on a GPS enabled wireless device in communication with a wireless network. The alert system periodically determines the speed of a vehicle by determining the speed of the wireless device carried therein, using GPS signals received by the wireless device. For example, speed can be calculated by dividing a certain distance that the wireless device travels by the time it takes to travel that distance. The vehicle's speed is then compared to the speed limit of the roadway on which the vehicle is traveling. The speed limit is determined by comparing the wireless device's location to map data relating to the geographic area around the location. The map data may be stored on the wireless device, or obtained from a map database accessible over the network. If the vehicle speed is above the speed limit, a notification or alert is issued.

19 Claims, 4 Drawing Sheets

VEHICLE SPEEDING ALERT SYSTEM FOR GPS ENABLED WIRELESS DEVICES

FIELD OF THE INVENTION

The present invention relates to communications and, more particularly, to notification services utilizing wireless devices.

BACKGROUND OF THE INVENTION

Reckless speeding on highways and other roadways has long been a problem in the United States and elsewhere, resulting in loss of life, injury, and millions of dollars in property loss on an annual basis. It has become an even greater problem as the number of vehicles in service has increased, with a corresponding increase in road traffic. Certain law enforcement officers are charged with enforcing the traffic laws, but limited municipal budgets make it impossible to provide large numbers of traffic police.

Aside from government enforcement, some individuals or entities have an interest in knowing how certain vehicles are utilized, and in particular whether vehicles are being used in a reckless manner through speeding. For example, parents may wish to know whether their teenage children are driving reasonably. Also, companies utilizing drivers as part of their ongoing businesses, e.g., trucking companies, delivery companies, and livery companies, may similarly wish to monitor the manner in which company vehicles are driven, or at least that traffic regulations are not being transgressed. Tracking and monitoring devices exist for such purposes, but are cumbersome, expensive, and difficult to install.

SUMMARY OF THE INVENTION

An embodiment of the present invention relates to a system for assessing the speed of an object. The system initially determines the speed of the object. This may be done by determining the speed of a wireless device associated with the object, for example a wireless device carried in a vehicle. Subsequently, a notification is generated relating to the speed. For example, information relating to the speed may be sent to a third party for notifying the third party of the vehicle's speed. By "wireless device," it is meant a mobile phone, a wireless PDA, a computerized vehicle navigation system, a wireless device with high-speed data transfer capabilities, such as those compliant with "3-G" or "4-G" standards, a "WiFi"-equipped computer terminal, or the like.

An embodiment of the present invention may be utilized by governmental transportation agencies to mandate that by a certain date new vehicles must be equipped with a speeding alert service and that the speeding alert service must be part of annual vehicle inspections.

In another embodiment, the speed is determined from global positioning system (GPS) signals received by the wireless device. For example, the location of the wireless device may be determined at a first time. The location of the wireless device is then determined at a second time. The speed is then calculated by dividing the distance between the two locations by the interval between the two times.

In another embodiment, the speed is assessed for determining whether to send the notification. For a vehicle speeding alert service, the speed is compared to the speed limit for the road on which the vehicle is traveling. The speed limit may be determined by correlating the vehicle's location to a map database containing road and speed limit data. If the vehicle is found to be exceeding the speed limit (or exceeding a buffer range of the speed limit), the notification is issued. The notification may be an alarm or alert on the wireless device, or a message sent to a third party, e.g., an employer or parent, alerting the third party that the vehicle has been speeding.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
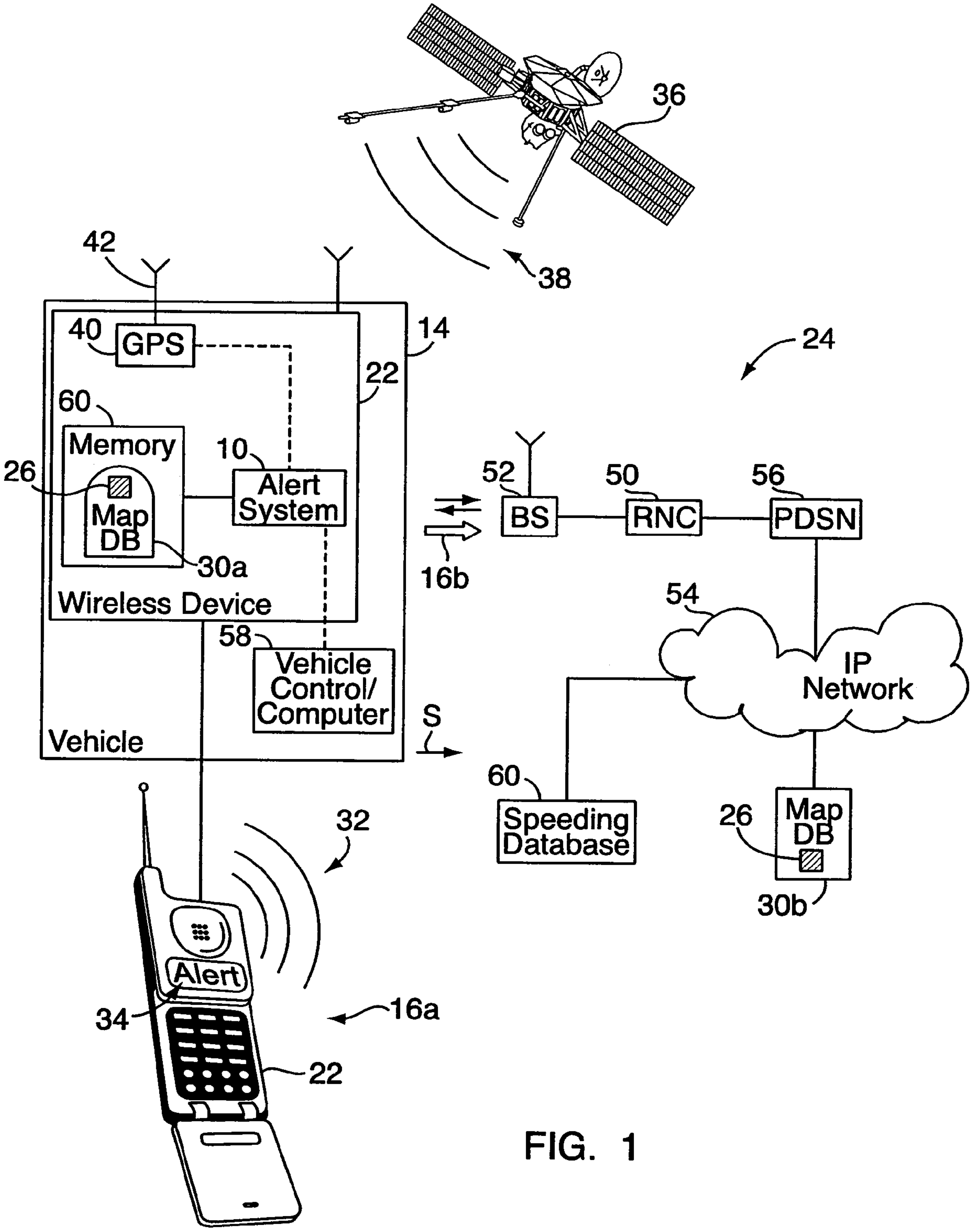
FIG. 1 is a schematic diagram of a speeding alert system according to an embodiment of the present invention.
Figure 2:
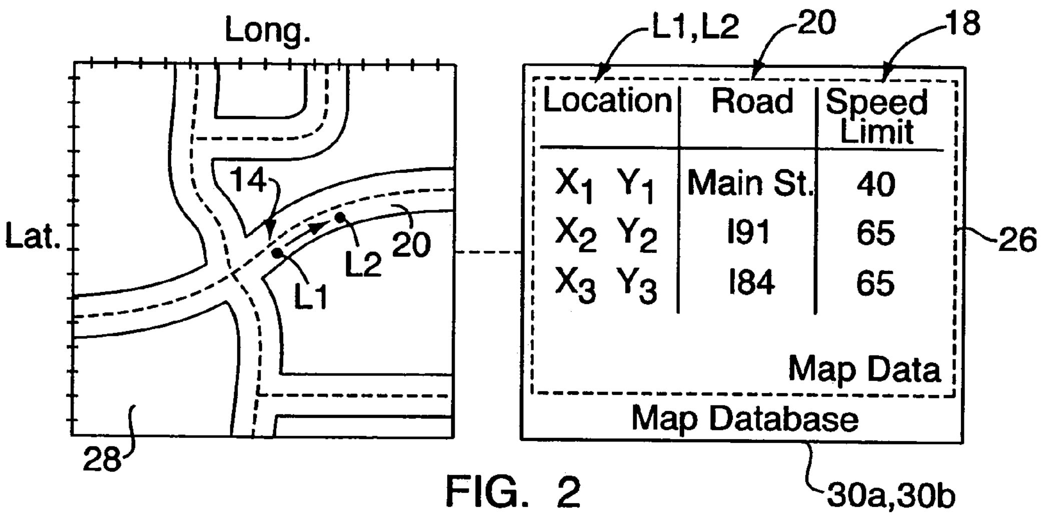
FIG. 2 is a schematic diagram of a map database portion of the system.
Figure 3:
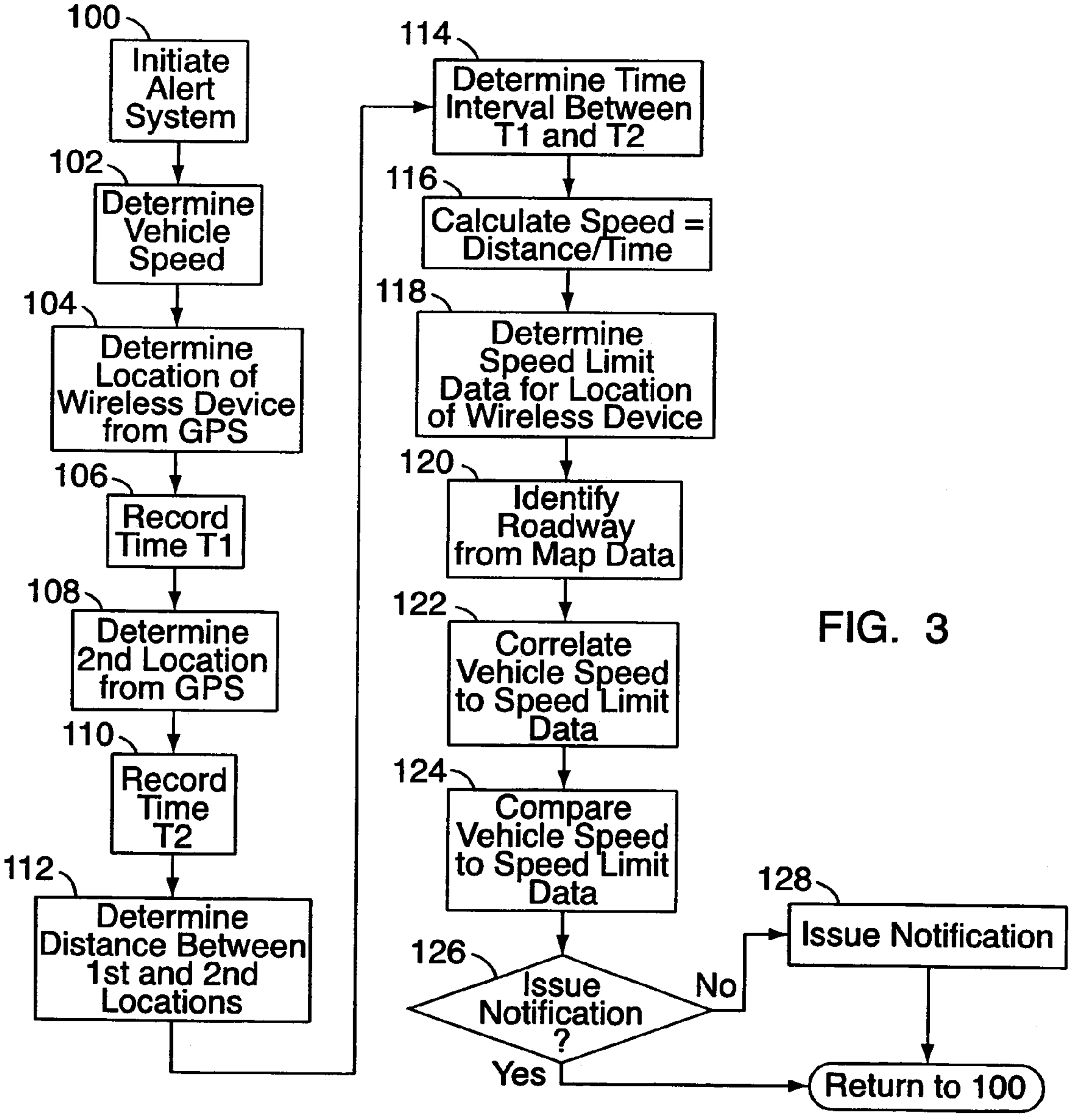
FIG. 3 is a flowchart showing operation of the system in FIG. 1.

With reference to FIGS. 1-3, an embodiment of the present invention relates to a vehicle speeding alert service or system 10 for tracking the speed of a vehicle 14 and issuing an alert, alarm, or other notification 16*a*, 16*b* when the vehicle's speed S is found to be above the speed limit 18 of the roadway 20 on which the vehicle 14 is traveling (see FIG. 2). The alert system 10 will typically be implemented on or in conjunction with a wireless device 22, which may be in communication with a wireless communication network 24. The wireless device 22 may be a mobile phone, a wireless PDA, a computerized vehicle navigation system, a wireless device with high-speed data transfer capabilities, such as those compliant with "3-G" or "4-G" standards, a "WiFi"-equipped computer terminal, or the like. The wireless network 24, for example, may be a cellular communication network configured for the wireless transmission of voice and non-voice data.

In operation, the alert system 10 periodically determines the speed S of the vehicle 14. If the wireless device 22 is an automated vehicle navigation system or other device interfaced with the vehicle's electronics/computer system 58, the speed S may be obtained from the vehicle computer system 58. Otherwise, the system 10 determines the speed of the wireless device 22. (Since the wireless device is associated with the vehicle by virtue of being carried therein, the speed of the vehicle 14 will typically correspond to the speed of the wireless device 22.) The speed of the wireless device 22 may be determined using GPS (global positioning system) data, if the wireless device is GPS enabled. For example, speed can be calculated by dividing a certain distance that the vehicle 14/wireless device 22 travels, as determined from the GPS data, by the time it takes the wireless device to travel that distance. The alert system 10 then compares the vehicle's speed S to the speed limit 18 of the roadway 20 on which the vehicle 14 is traveling. The identity of the roadway 20 is determined by comparing the wireless device's location L1, L2 (determined from the GPS data) to map data 26 relating to the geographic area 28 around the location L1, L2. The map data 26 may be obtained and/or referenced from a map database 30*a* stored on the wireless device 22 and/or from a map database 30*b* accessible over the network 24. If the alert system 10 determines that the vehicle speed S is outside a designated range of the speed limit 18, a notification 16a, 16b is issued. The notification may be an alert/alarm 16a such as an audio alarm 32 or visual alert 34, or it may be a message 16b sent over the network 24, as further discussed below. Upon issuing the notification 16a, 16b, and especially an audio alarm 32, it is contemplated that the driver of the vehicle 14 will cause the vehicle to slow down.

The global positioning system is a satellite navigation system used for determining an end user's position on the Earth's surface. The GPS includes a constellation of medium earth orbit satellites 36 that transmit several civilian and military encoded time signals 38 down towards the Earth. Each satellite uses an on-board atomic clock to generate the encoded time signals, which are synchronized and maintained through radio communications by several GPS ground control stations. GPS receivers 40 (e.g., portable electronic devices carried by end users) receive and decode the time signals from multiple (four or more) satellites, and the receiver's location (e.g., latitude, longitude, and/or elevation) is calculated from these signals using trilateration algorithms. The GPS receivers 40 may also calculate precise UTC traceable time from the received time signals as modified by any necessary correction factors. Accessing the civilian portion of the GPS service is unrestricted and free of charge.

GPS receivers 40 have gradually reduced in size due to increasingly smaller and more integrated electronics. Accordingly, they are now routinely included even in small, portable wireless devices 22. As indicated in FIG. 1, a GPS enabled wireless device 22 will typically include a built-in GPS antenna 42 and a miniature GPS receiver 40 operably connected to the wireless device's operational system, e.g., electronics hardware and/or software.

The network 24 may be any type of wireless communications network. For example, the network 24 may be a CDMA-based 1x-EVDO communications network having a radio network controller ("RNC") 50 and one or more fixed base stations ("BS") 52. (1x-EVDO is an implementation of the CDMA2000® "3-G" mobile telecommunications protocol/specification configured for the high-speed wireless transmission of both voice and non-voice data.) The base stations 52 are provided with various transceivers and antennae for radio communications with the wireless devices 22, while the radio network controller 50 directs data transfer to and from the base stations 52 for transmission to the wireless devices 22.

For conducting wireless communications between the base stations 52 and the wireless devices 22, the network 24 may utilize a CDMA (code division multiple access) spread-spectrum multiplexing scheme. In CDMA-based networks, transmissions from wireless devices to base stations are across a single frequency bandwidth known as the reverse link, e.g., a 1.25 MHz bandwidth centered at a first designated frequency. Generally, each wireless device 22 is allocated the entire bandwidth all the time, with the signals from individual wireless devices being differentiated from one another using an encoding scheme. Transmissions from base stations to wireless devices are across a similar frequency bandwidth (e.g., 1.25 MHz centered at a second designated frequency) known as the forward link. The forward and reverse links may each comprise a number of traffic channels and signaling or control channels, the former primarily for carrying voice data, and the latter primarily for carrying the control, synchronization, and other signals required for implementing CDMA communications. The network 24 may be geographically divided into contiguous cells, each serviced by a base station, and/or into sectors, which are portions of a cell typically serviced by different antennae/receivers supported on a single base station.

The network 24 may include a core packet data network 54 for the long distance wire-line transmission of packet data, and/or for interconnecting various components or portions of the network 24. For example, the core packet data network 54 may be used to connect the radio network controller 50 to a network service or administration module, or to one or more external networks such as a public switched telephone network. As should be appreciated, the core packet data network 54 may be a dedicated network, a general-purpose network (such as the Internet), or a combination of the two. Typically, the radio network controller 50 will be connected to the packet data network 54 by way of a packet data serving node ("PDSN") 56 or the like. For high-speed data transmission across the packet data network 54 (e.g., for facilitating web browsing, real time file transfer, or downloading large data files), the network 24 may use the Internet Protocol ("IP"), where data is broken into a plurality of addressed data packets. Additionally, VoIP (voice over IP) may be used for voice-data transmission. (With VoIP, analog audio signals are captured, digitized, and broken into packets like non-voice data.) Both voice and non-voice data packets are transmitted and routed over the wireless network 24, where they are received and reassembled by the wireless devices to which the data packets are addressed.

According to one embodiment of the speeding alert service or system 10, the system 10 is implemented on the wireless device 22 in the form of a computer program/script and/or as a hardware/software module. FIG. 3 illustrates in more detail the manner in which the system 10 operates. At Step 100, the alert system 10 is initiated. This may be done automatically periodically according to the alert system's programming, e.g., once every several minutes. It may also be done automatically randomly or semi-randomly, e.g., once in a particular, randomly generated time frame of between one and ten minutes. It may also be done upon receipt of a command from the user of the wireless device 22, or one received from or over the network 24. For example, a third party such as a parent or employer could initiate the alert system 10 for periodically monitoring the end user. The alert system 10 could also be initiated upon the occurrence of some event. For example, if the alert system 10 is in communication with the vehicle's electronics/computer system 58, the alert system could be automatically periodically initiated during times when the vehicle is traveling above a certain threshold speed. For example, it may be the case that a vehicle traveling at or below 20 mph will never be considered as exceeding a speed limit (depending on the geographical area 28 in which the vehicle is traveling), meaning that it is unnecessary to utilize the alert system 10 during these times.

Upon initiation, at Step 102 the speed S of the vehicle 14 is determined. If the wireless device 22 associated with the vehicle is in communications with the vehicle's computer system 58, the speed S may be determined by retrieving vehicle speed information from the computer system 58. Otherwise, the system 10 determines the speed of the wireless device 22, as may be done according to Steps 104-116. For example, at Step 104 a location L1 of the wireless device 22 is determined from the GPS signals 38 received by the wireless device. At Step 106, the time T1 of when the location L1 was determined is recorded. At Step 108, another location L2 of the wireless device 22 is determined at a time T2. (Typically, the time interval between T1 and T2 will be no more than several seconds long; if too long, the possibility arises of an inaccurate result if the vehicle happens to take a turn, double back, or is on a winding road.) At Step 110, the time T2 is recorded. At Step 112, the distance between the two locations L1 and L2 is determined. At Step 114, the time interval between the two recorded times T1 and T2 is determined. This results in the distance traveled and the time elapsed in traveling this distance. At Step 116, the speed of the wireless device 22 is determined by dividing the distance L2-L1 by the time interval T2-T1, which corresponds to the speed S of the vehicle 14:

$$S=(L2-L1)/(T2-T1)$$

At Step 118, speed limit information/data 18 is obtained for the location of the vehicle and wireless device. The data from the speed calculation may be used to provide the location data for this purpose, e.g., since the two will typically be close together, the location L1 or the location L2. To obtain the speed limit data 18, at Step 120 the identity of the roadway 20 on which the vehicle 14 is traveling is determined. This may be done by cross referencing the location L1, L2 of the wireless device 22 to the map data 26 relating to the geographic area 28 around the location L1, L2 (see FIG. 2). The map data 26 may be obtained and/or referenced from a map database 30*a* stored on the wireless device 22, e.g., in wireless device memory 60, and/or from the map database 30*b* accessible over the network 24. For example, the map database 30*b* may be a general-purpose map database or system accessible over the network 24 by way of the IP network 54. The wireless device 22 could query the database 30*b* by sending appropriate commands, requests, or other messages over the network 24 (e.g., the message would include the location L1, L2), with the database 30*b* sending back the requested information. Alternatively, the alert system 10 could download from the database 30*b* and over the network 24 the portion of the map database 30*b* relating to the geographic area 28 surrounding the location of the wireless device 22 (e.g., a 10 mile radius), for storage in the device's memory 60. The contents of any downloaded data could be refreshed or updated automatically periodically, or based on when the wireless device travels into new areas, including possibly factoring in the vehicle's speed S. (For example, if a vehicle is traveling at 60 mph, map content for a ten mile radius would need to be updated at least every 10 minutes.) In either case, the correlation of location data (e.g., GPS coordinate data in terms of longitude and latitude) to a map database for purposes of determining nearby geographical features such as the identity of a roadway 20 is well known in the art.

Once the identity of the roadway 20 has been determined, at Step 122 the speed limit data 18 for that roadway is determined by referring to the map database 30*a*, 30*b*, which contains the speed limit 18 at least for major roadways 20. For example, the speed limit data 18 may be determined through a database query or lookup for the roadway in question. For any gaps in speed limit data, the speeding alert system 10 may be configured to use one or more base or assumed speed limits. Thus, if the wireless device 22 is traveling on a roadway for which no speed limit data 18 is provided and/or available, the system 10 may assume a particular speed limit depending on the type of road, or it may assume a maximum speed limit for all roads collectively (e.g., generally 65 mph in many U.S. states) for purposes of at least identifying egregious acts of speeding.

Instead of using one location L1, L2, speed limit data 18 may be obtained for both locations, as a backup check in cases where the vehicle has traversed from a high speed limit zone to a low speed limit zone or vice versa. For example, if the vehicle passes from a high speed limit zone into a low speed limit zone during the speed calculation, using the location L1 as a basis for the speed limit data might result in a finding that the vehicle is not speeding even when it is, and using the location L2 might result in a finding that the vehicle is speeding when in fact it is not. Since in this case it has not been determined how long the vehicle has been in each zone, the presence of two different speed limits 18 at the two locations L1, L2 may be used as a basis for immediately re-initiating the speeding alert system 10 for subsequently determining the vehicle's speed in the new zone. For example, if a vehicle 14 traverses from a 60 mph location L1 to a 30 mph location L2, determining that the speed S of the vehicle 14 is 45 mph is an indication that the vehicle might have slowed down, but is not determinative since the vehicle could have been traveling slow in the faster zone but is now speeding in the slower zone. However, re-initiating the system 10 in such a situation will typically result in a determination of the vehicle's speed in the new zone. (The process may be re-initiated until both locations L1, L2 show the same speed limit 18.) Of course, such a measure would only be necessary where the speed S is determined using a distance/time calculation, and not in cases where the speed is determined directly from the vehicle computer system.

At Step 124, the speed S of the vehicle 14, as determined at Step 102, is compared to the speed limit data 18 for the roadway 20 on which it has been determined that the vehicle 14 is traveling. These may be compared by calculating the difference ΔS between the two values as:

$$\Delta S=S-(\text{speed limit } 18)$$

This is applicable to situations where the speed limit data 18 reflects a maximum speed, and to situations where the speed limit data 18 reflects a minimum speed. At Step 126, the value of ΔS is assessed for determining whether to issue a notification 16*a*, 16*b*. For example, in one embodiment the alert system 10 may simply determine if the vehicle speed S exceeds a maximum speed limit or falls below a minimum speed limit 18. Alternatively, it may be determined if the vehicle speed S falls outside a buffer range of the speed limit 18. For example, to compensate for possible computational and/or measurement inaccuracies, and considering that exceeding the speed limit by a slight amount (e.g., 5 mph in excess) is usually considered reasonable in most jurisdictions, the alert system 10 may determine if the value of ΔS is above the buffer range (the absolute value of ΔS in this equation may be taken for cases involving a minimum speed limit):

$$\Delta S>\text{buffer range}$$

Thus, for example, if the speed limit 18 is 65 mph, and S is determined as 70 mph, the vehicle 14 would be considered as speeding without a buffer range, and not to be speeding if there is a buffer range of 5 mph or greater.

If it is determined at Step 126 not to issue a notification 16*a*, 16*b*, no notification is issued and the alert system 10 returns to a standby state until it is next re-initiated, as described above. If it is determined at Step 126 to issue a notification 16*a*, 16*b*, the notification 16*a*, 16*b* is issued at Step 128. The notification may take several forms. For example, it may be a notification 16*a* for sounding an audio alarm 32 or text alert 34 on the wireless device 22 for alerting the user that the vehicle is speeding. It may also take the form of a command, issued to the vehicle's electronics/computer system 58 for causing the vehicle to slow down. Alternatively or in addition, the notification may be a message 16*b* sent over the network 24 to a speeding database 60. The speeding database 60 may be maintained and monitored by law enforcement agencies for issuing violations, by other governmental agencies for statistics and road use purposes, or it may be a database accessible by third parties for determining if particular users are speeding. For example, the speeding database 60 may be part of an Internet website accessible by authorized third parties (e.g., parents and employers). The third parties would simply access the website and database 60, log in under a pre-established account name and password, and then access the records of any wireless device users associated with their account. If the database 60 included instances of speeding for the users in question, as received from the alert system 10 and stored on the database 60, the third party could then take further action if desired, such as remedial or cautionary measures.

The notifications 16*a*, 16*b* may simply indicate that a speed limit 18 (with or without a buffer) has been exceeded, or they may contain more detailed information such as the degree of speeding and the time and date of the incident in question. For example, the notification 16*b* sent over the network 24 could be a command for issuing an automated voice message, a text message, an e-mail message, or the like sent to a third party for notification purposes, e.g., "The cell phone associated with number 413-555-1212 was found to be traveling at approximately 100 mph on Interstate 84 westbound near Vernon, Conn. at 1:14 pm on Monday, Mar. 3, 2006."

Figure 4:
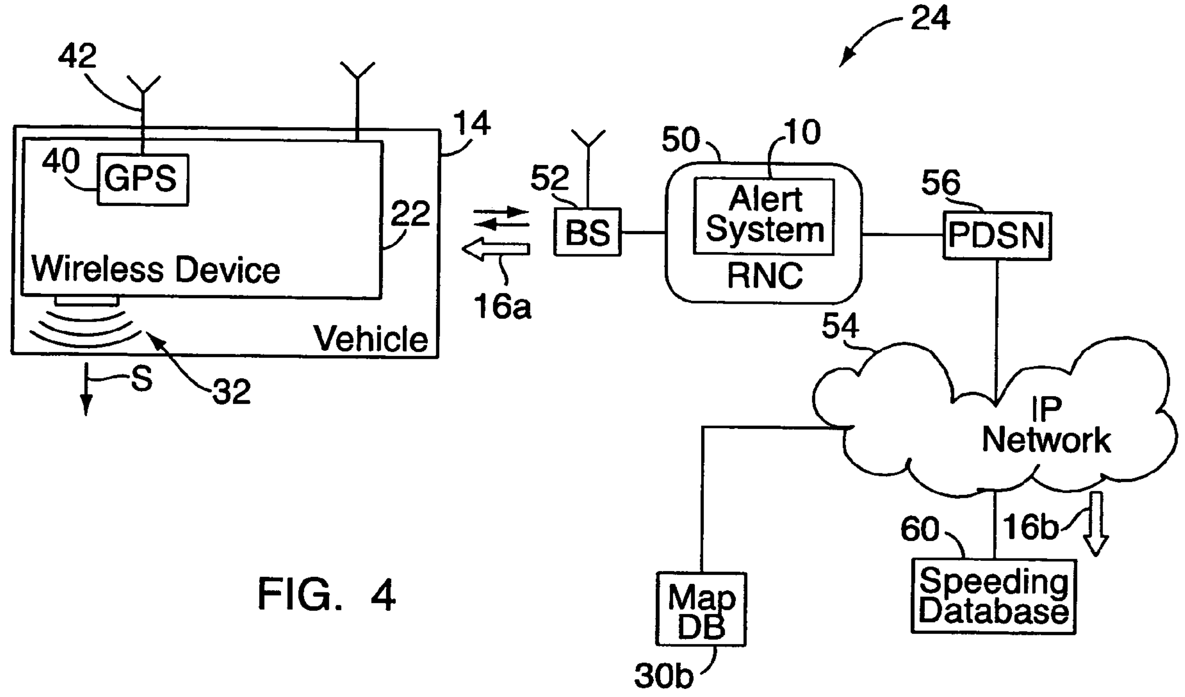
FIG. 4 is a schematic diagram of an additional embodiment of the speeding alert system.
Figure 5:
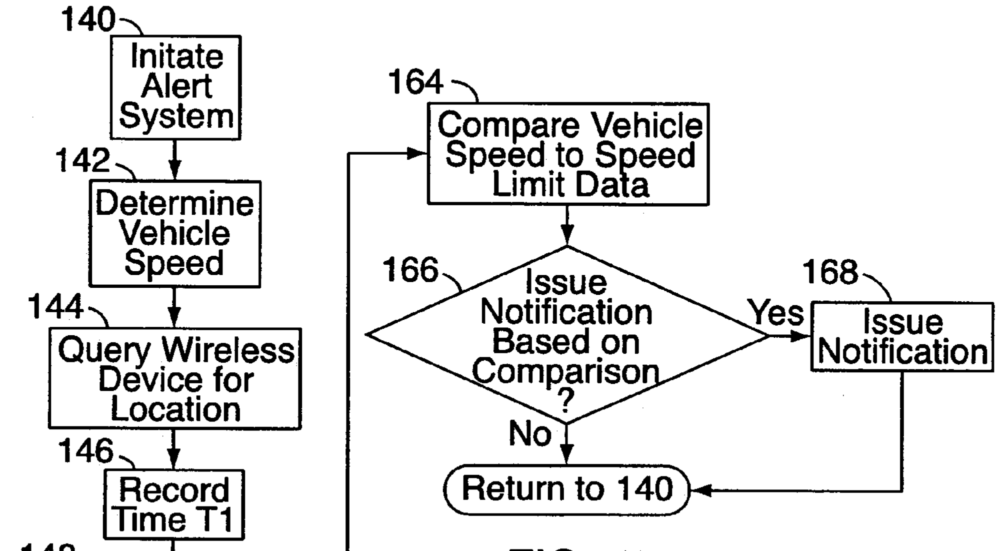
FIG. 5 is a flowchart showing operation of the system in FIG. 4.
Figure 5:
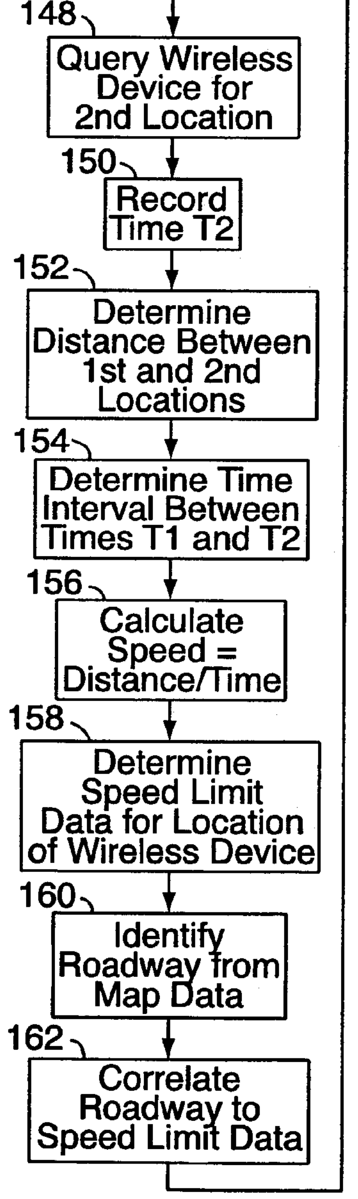

According to an additional embodiment of the present invention, the alert system 10 may be implemented on the network 24, in whole or in part, instead of solely on the wireless device 22. For example, as shown in FIGS. 4 and 5, the alert system 10 may be deployed on the RNC 50. Here, the alert system 10 would work in a manner similar to as described above with reference to FIGS. 1-3. For example, at Step 140 the alert system 10 is initiated as described above. Upon initiation, at Step 142 the speed S of the vehicle 14 is determined. This may be done by determining the speed of the wireless device 22, as according to Steps 144-156. For example, at Step 144, the alert system 10 queries the wireless device 22 for causing the wireless device to determine a location L1 of the wireless device 22 from the GPS signals 38 received by the wireless device. This information is sent back to the alert system 10. At Step 146, the time T1 of when the location L1 was determined (or when the information was received from the wireless device 22) is recorded. At Step 148, the wireless device 22 is again queried for determining another location L2 of the wireless device 22. At Step 150, the time T2 of when the location L2 was determined is recorded. At Step 152, the distance between the two locations L1 and L2 is determined. At Step 154, the time interval between the two recorded times T1 and T2 is determined. At Step 156, the speed S of the vehicle is determined by dividing the distance L2-L1 by the time interval T2-T1.

At Step 158, speed limit data 18 is obtained for the location of the wireless device. To obtain the speed limit data 18, at Step 160, the identity of the roadway 20 on which the vehicle 14 is traveling is determined. Once the identity of the roadway 20 has been determined, at Step 162 the speed limit data 18 for that roadway is determined by referring to the map database 30*a*, 30*b*. At Step 164, the speed S of the vehicle 14, as determined at Step 142, is compared to the speed limit data 18 for the roadway 20 on which it has been determined that the vehicle 14 is traveling, by calculating the difference ΔS between the two values. At Step 166, the value of ΔS is assessed for determining whether to issue a notification 16*a*, 16*b*.

If it is determined at Step 166 not to issue a notification 16*a*, 16*b*, no notification is issued and the alert system 10 returns to a standby state until it is next re-initiated. If it is determined at Step 166 to issue a notification 16*a*, 16*b*, the notification 16*a*, 16*b* is issued at Step 168. The notification may be, for example, a message 16*a* sent to the wireless device 22 for sounding an audio alarm 32 or displaying a text alert 34 on the wireless device 22 for alerting the user that the vehicle is speeding.

Figure 6:
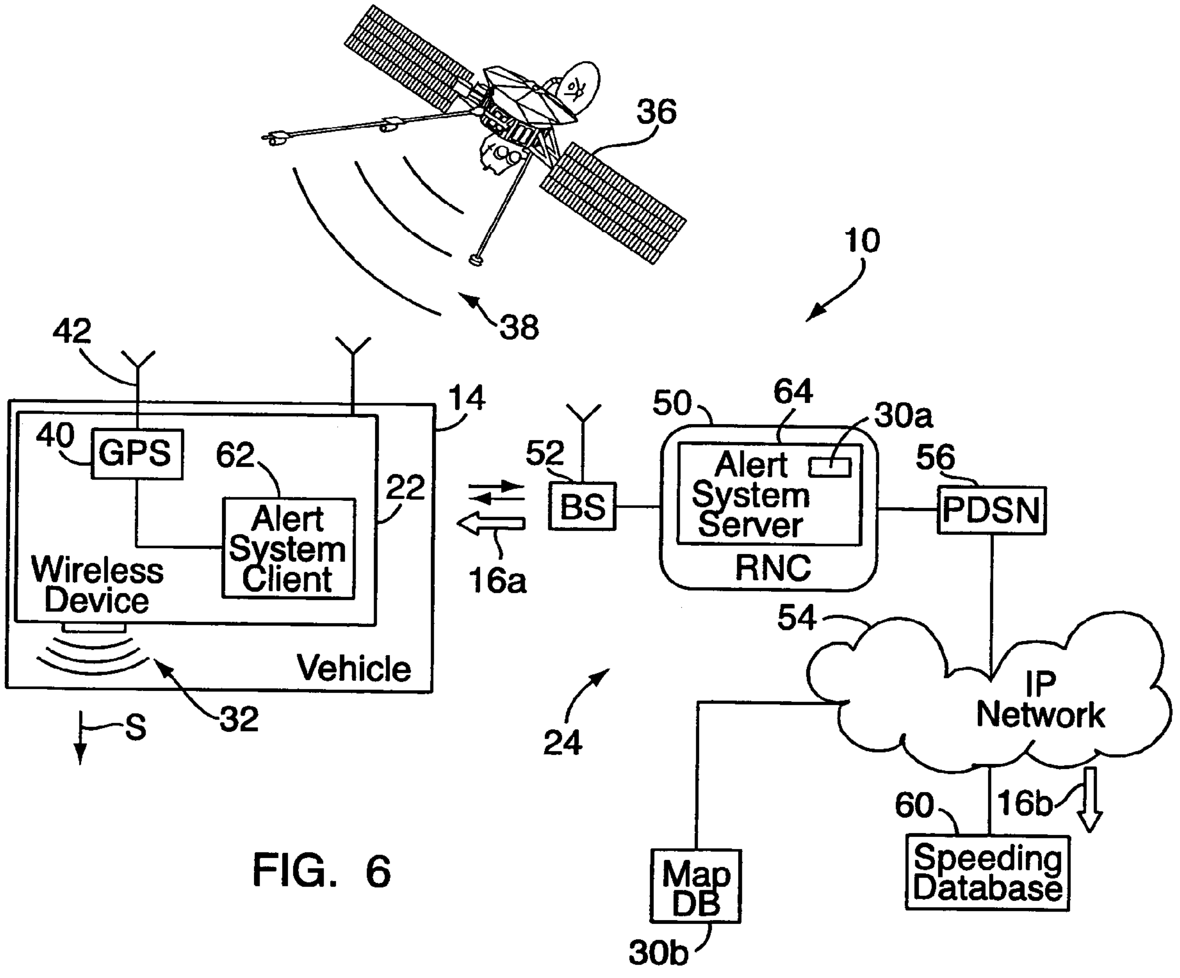
FIG. 6 is a schematic diagram of an additional embodiment of the speeding alert system.
Figure 7A:
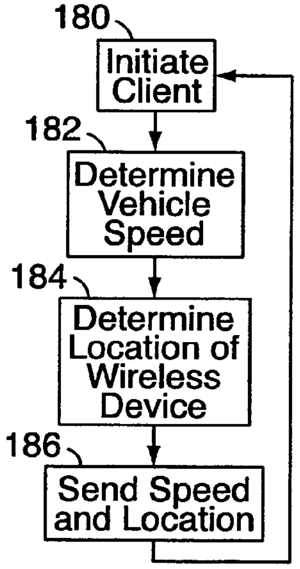
FIGS. 7A and 7B are flowcharts showing operation of the system in FIG. 6.
Figure 7B:
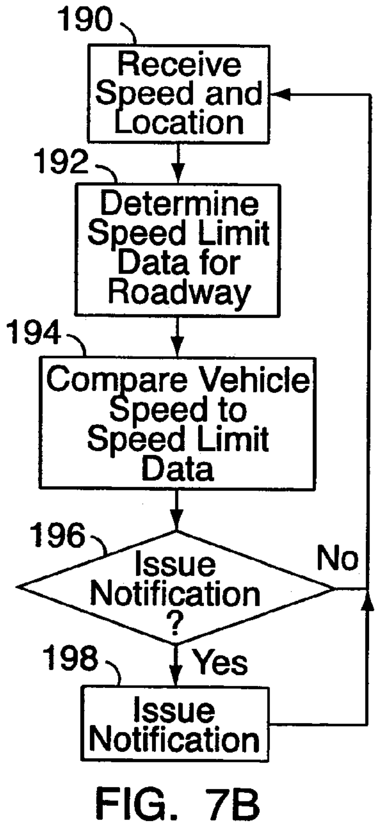

As shown in FIGS. 6, 7A, and 7B, the speeding alert system 10 may be implemented in a "client/server" configuration by deploying a portion of the system functionality on the wireless device 22 and a portion on the network 24. Such a configuration would be useful in situations where the wireless device 22 has limited capabilities or resources such as memory and processor power. As indicated, the system 10 in this embodiment includes an alert system client 62 in place on the wireless device 22, and an alert system server 64 in place on the RNC 50. (The server 64 could also be implemented on the base station 52 or elsewhere in the network 24.) The client 62 is configured to determine the speed S of the vehicle 14 on a periodic basis or otherwise (similar to as described above, e.g., automatically or upon prompting from the server 64), as at Steps 180 and 182 in FIG. 7A. At Step 184, the client 62 also determines the location of the wireless device 22. At Step 186, this information is sent to the server 64. At Step 190 in FIG. 7B, this information is received by the server 64. At Step 194, the server 64 then compares the speed S to the speed limit data 18 for the roadway 20 on which the vehicle 14 is traveling, as determined by correlating the location to map data 26 at Step 192 (e.g., the roadway is determined by correlating the location data to the map data, and the speed limit data is determined by correlating the roadway to the speed limit data, through a lookup or query operation or the like). The map data 26 may be stored and retrieved from a map database 30*b* accessible over the IP network 54, as described above. Alternatively, the map data 26 may be stored in a map database 30*a* on the RNC 50. In this case, similar to as described above, the database 30*a* could be a permanent or static database, or it could include map data 26 periodically retrieved or refreshed from the network accessed database 30*b* for the location and/or vicinity 28 of the vehicle 14.

At Step 196, the server 64 determines whether to issue a notification 16*a*, 16*b* based on the comparison between the vehicle speed S and the speed limit data 18. If it is determined at Step 196 to issue a notification 16*a*, 16*b*, the notification 16*a*, 16*b* is issued at Step 198. The notification may be, for example, a message or command 16*a* sent to the wireless device 22 for sounding an audio alarm 32 or the like, or a message sent to a speeding database 60.

As should be appreciated, there may be situations where it is desired to determine the speed S of a wireless device 22 and/or associated vehicle or other object 14 for purposes other than determining if the object 14 is exceeding a speed limit, and/or without having to refer to specific speed limit data 18. For such a configuration, the system 10 may be configured to determine the speed S, and to then issue a notification relating to the speed S. For example, the notification could contain data indicating the determined speed, the time and date of the determination, or the like. The notification could be a text message displayed on the wireless device 22 (e.g., for a user to verify that a vehicle speedometer is accurate), or a message sent over the network 24 to a third party. The notification could be sent to an employer, who would use the information for statistical purposes such as tracking vehicle speed and usage generally. The information could also be used for initiating disciplinary action, e.g., if the notification indicated that the wireless device 22 had traveled over a maximum regional speed limit such as 65 mph.

Although the speeding alert system has been primarily illustrated with respect to the GPS system, it should be appreciated that the system could also be implemented with similar global or regional positioning systems. As such, the terms GPS and global positioning system as used herein refers to both the GPS system as maintained by the U.S. government, but also to similar systems, whether public or private.

Since certain changes may be made in the above-described vehicle speeding alert system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A method for assessing the speed of an object, the method comprising the steps of:

determining the speed of a wireless device associated with the object, said wireless device being a first general purpose, global positioning system (GPS)-enabled mobile phone, wherein the speed is determined from at least one GPS signal received by the mobile phone; and generating a notification relating to the speed.

2. The method of claim 1 further comprising:

comparing the speed of the wireless device to speed information for a first location of the wireless device; and determining whether to generate the notification based on said comparison.

3. The method of claim 1, wherein:

the speed of the mobile phone is determined upon receiving a command from a third party individual over a public wide area wireless network in communication with the mobile phone.

4. The method of claim 3 further comprising:

transmitting the notification over the wireless network to a speeding database, said speeding database being accessible by the third party through an Internet website, and said notification including data relating to: the determined speed of the mobile phone, an identification of the mobile phone, and a time and date when the speed was determined.

5. The method of claim 3 wherein:

the command is transmitted from a second general purpose mobile phone, said second mobile phone being operated by the third party; and the method further comprises transmitting the notification over the wireless network to the second mobile phone, said notification including data relating to: the determined speed of the first mobile phone, an identification of the first mobile phone, and a time and date when the speed was determined.

6. The method of claim 2 further comprising:

transmitting at least one of: information relating to said comparison; the speed and the first location; and the notification to a wireless network in communication with the wireless device.

7. The method of claim 2 wherein:

the speed information comprises speed limit data retrieved from a map database containing information about the first location, said map database being stored on at least one of the wireless device and a wireless network in communication with the wireless device.

8. The method of claim 7 wherein:

the map database is stored on the wireless device; and the map database is periodically refreshed from a master database stored on the wireless network.

9. The method of claim 7 further comprising:

determining a difference between the speed limit data and the speed of the wireless device; and generating the notification if the difference is outside a designated range.

10. The method of claim 9 further comprising:

transmitting the notification to at least one of the wireless device and a speeding database accessible over the wireless network.

11. The method of claim 10 further comprising:

initiating an alarm on the wireless device if the notification is generated.

12. The method of claim 1 wherein the speed of the mobile phone is periodically automatically determined at random or semi-random times.

13. The method of claim 2 wherein:

the speed information comprises speed limit data retrieved from a map database containing information about the first location, said map database being stored on at least one of the wireless device and a wireless network in communication with the wireless device; and the method further comprises:

determining a difference between the speed limit data and the speed of the wireless device;

generating the notification if the difference is outside a designated range; and transmitting the notification to at least one of the wireless device and a speeding database accessible over the wireless network.

14. A method for assessing the speed of an object, the method comprising the steps of:

determining the speed of a wireless device associated with the object; and transmitting a notification relating to the speed to a speeding database, said notification being transmitted over a wireless network in communication with the wireless device, and said notification including data relating to: the determined speed of the wireless device, an identification of the wireless device, and a time and date when the speed was determined, wherein the speeding database is accessible to authorized third parties through an Internet website.

15. The method of claim 14 wherein the wireless device is general purpose, global positioning system (GPS)-enabled mobile phone, and wherein the speed is determined from at least one GPS signal received by the mobile phone.

16. The method of claim 14 wherein the speed of the wireless device is periodically automatically determined at the wireless device at random or semi-random times.

17. A method for assessing the speed of a vehicle, the method comprising the steps of:

receiving a command at a general purpose, global positioning system (GPS)-enabled mobile phone carried in the vehicle, said command originating from a third party individual and being received over a public wide area wireless network in communication with the mobile phone;

in response to said command, determining the speed of the mobile phone based at least in part on at least one GPS signal received by the mobile phone; and transmitting a notification relating to the speed over the wireless network, wherein the notification is transmitted to or otherwise accessible to the third party, and wherein the notification includes data relating to: the determined speed of the mobile phone, an identification of the mobile phone, and a time and date when the speed was determined.

18. The method of claim 17 wherein the notification is transmitted over the wireless network to a speeding database, said speeding database being accessible to the third party through an Internet website.

19. The method of claim 17 wherein the third party is an authorized party that owns the mobile phone, said mobile phone being carried by a user other than the third party but with the third party's permission.

* * * * *